United States Patent [19]

Bollhagen et al.

[11] Patent Number: 5,077,635

[45] Date of Patent: Dec. 31, 1991

[54] CAPACITIVE POSITION SENSOR

[75] Inventors: Heins-Erdam Bollhagen, Leonberg; Siegbert Steinlechner, Leonberg-Warmbronn; Berthold Wocher, Leonberg, all of Fed. Rep. of Germany

[73] Assignee: Robert Bosch GmbH, Stuttgart, Fed. Rep. of Germany

[21] Appl. No.: 682,585

[22] Filed: Apr. 8, 1991

[30] Foreign Application Priority Data

May 22, 1990 [DE] Fed. Rep. of Germany ....... 4016434

[51] Int. Cl.$^5$ .......................... H01G 5/01; H02P 1/00; G01R 27/26
[52] U.S. Cl. .................................... 361/287; 318/662; 324/725
[58] Field of Search .................. 324/61 R; 340/870.37; 361/277, 278, 287, 298, 299; 318/662

[56] References Cited

U.S. PATENT DOCUMENTS 3,760,392 9/1973 Stich ................................ 318/254 X
4,142,144 2/1979 Rohr ................................ 324/725
4,463,299 7/1984 Langley et al. ..................... 318/662
4,999,734 3/1991 Smith ............................... 361/278

Primary Examiner—Donald A. Griffin
Attorney, Agent, or Firm—Michael J. Striker

[57] ABSTRACT

A capacitive position sensor includes a capacitor arrangement assembled of a stator (5) and a rotor (6). The stator supports at least three coplanar electrodes (21, 22, 23) having the shape of circle sectors 120°. The rotor supports at least a counterelectrode (25) having the shape of a circle sector of 240°. An oscillator (30) applies two a.c. voltage (u1, u2) of equal amplitude and opposite phase to two of the stator electrode (21, 22). The range of rotation of the rotor is such that the remaining third electrode on the stator is always overlapped by the counterelectrode. Voltage induced on the counterelectrode by means of the a.c. voltages on the stator electrodes is inverted and fed back as a neutralizing voltage (uR) to the third stator electrode (23) until the induced voltage on the counterelectrode reaches zero value. The neutralizing voltage is rectified and integrated into a d.c. voltage (UA) which serves as a measure of the angular position of the rotor (6).

18 Claims, 8 Drawing Sheets

CAPACITIVE POSITION SENSOR

BACKGROUND OF THE INVENTION

The present invention relates to a capacitive position sensor, particularly an angular position sensor for determining the position of a throttle valve in an internal combustion engine.

In many fields of technology it is required to determine the position of an element of a device in order to influence certain operational variables or parameters of the device in dependency on the ascertained position.

In the motor vehicle technology it is necessary, among other things, to determine the position of the throttle valve and to transmit corresponding information to a control apparatus for adjusting predetermined operational parameters, such as ignition time points, injection duration and the like, of the internal combustion engine.

It is known to ascertain the throttle valve position by means of a potentiometer. Due to wear phenomena, this solution has the disadvantage of an insufficient reliability. In particular, during operation of an internal combustion engine, very large temperature fluctuations and strong vibrations occur. Consequently, resistance potentiometers in the long run cannot guarantee sufficient reliability under such operational conditions.

From the U.S. Pat. No. 4,644,570 an inductive position pickup device is known. It includes coils arranged on a substrate and cooperating with movable elements in the form of circular segments whose relative position to the coils is ascertained by means of eddy current measurement. The coil arrangement is mirror symmetrical and the more a circular segment overlaps one coil the more it clears the other coil. The coils are connected to an electronic evaluation circuit. However, the discrete current paths in the respective coils of the arrangement produce corresponding ripples in the magnetic fields through which non-linearities result.

SUMMARY OF THE INVENTION

A general object of the present invention is to overcome the disadvantages of the prior art position sensors.

In particular, it is an object of the invention to provide a position sensor which delivers its measuring result with an improved reproducibility and linearity.

Another object of the invention is to provide such an improved position sensing device whose output is substantially independent of temperature fluctuations and vibration loads.

In keeping with these objects and with others, which will become apparent hereafter, one feature of the invention resides in the provision of a capacitive position sensor, preferably an angular position sensor for determining position of a throttle valve in an internal combustion engine, which includes a capacitor arrangement assembled of two opposite electrode structures which are movable relative to each other such that the capacitance value of the arrangement depends on the mutual position of the structures; one of the electrode structures includes three electrode sections and the other electrode structure includes a counterelectrode section; a first electrode section of the one structure is connected to a source of a first a.c. voltage (u1) and a second electrode section is connected to a source of a second a.c. voltage (u2) having opposite phase than the first a.c. voltage; a third a.c. voltage (uR) delivered by electronic regulating means which are connected to the counterelectrode section; the regulating means adjust the magnitude and phase of the third a.c. voltage (uR) to a value at which an a.c. voltage, electrostatically induced at the counterelectrode section by the combined effect of the first, second and third a.c. voltages on the respective electrode sections, is neutralized to zero. The adjusted magnitude and phase value of the third a.c. voltage (uR) is converted into a d.c. reference voltage which serves as a measure of the relative position of the two movable electrode structures.

In contrast to the above discussed prior art position sensors, the operation of the pickup device or sensor of the invention is based on capacitors whereby the first and second a.c. voltages are applied at opposite phase to the first and second electrode sections to produce an electric field which induces a voltage on the counterelectrode section of the other electrode structure. The first and second a.c. voltages have a predetermined fixed amplitude value. The third a.c. voltage is adjusted according to the relative position of the two movable electrode structures such as to reduce the induced voltage at the counterelectrode to zero or, alternatively, to another predetermined fixed value. Inasmuch as the two opposite electrode structures cooperate without any mechanical contact, no wear phenomena can occur. Depending on the position of the first and second electrode sections on the one electrode structure relative to the counterelectrode section on the other electrode structure, there result variable active capacitor areas between the facing electrodes of the capacitor arrangement. The active capacitor surface of one electrode section increases (or decreases) in proportion to the decrease (or increase) of the active capacitor surface of the other electrode section. The third electrode section always faces the counterelectrode section in any mutual position of the two electrode structures. Consequently, the electric field of the third electrode section is dependent of the relative position of the two movable electrode structures. With advantage, the latter effect is achievable by delimiting the range of relative movement of the two opposite electrode structures such as to maintain a constant overlap of the entire surface of the third electrode section by a corresponding surface portion of the counterelectrode section in any position of the movable electrode structures, thus maintaining a constant active capacitor area between the third electrode section and the counterelectrode section.

The counterlectrode section partially overlaps the first and second electrode sections in such a manner that with a position change between the two electrode structures, the active capacitor area between the first electrode section and the counterelectrode section diminishes (or increases) to the extent as increases (or diminishes) the active capacitor area between the second electrode section and the counter-electrode section. The induced voltage at the counter-electrode section changes accordingly.

In order to homogenize the respective electrical fields of the capacitor arrangement, the other electrode structure in addition to the counterelectrode section is provided with a fourth electrode section.

In a preferred embodiment of the invention, the capacitive position sensor serves for determining the angular position of a component. Both electrode structures of the capacitor arrangement are in the form of circular plates arranged in parallel and opposite each other. One of the circular plates is fixedly mounted to form a stator, and the other plate is supported for rotation about its center point to form a rotor.

With advantage, the first, second and third electrode section has the form of a circle sector approaching an angle of 120°. The full angle of 120° cannot be reached because of an insulating space between the respective electrode sectors.

The capacitor arrangement of the invention can be realized in a simple way by means of conductor plates placed on a substrate and processed by etching to achieve the desired electrode structures. The substrate of the etched plates forms a support for the resulting electrode sectors.

The counterelectrode section has the shape of a circle sector of about 240°. It is placed on the substrate forming the other electrode structure of the capacitor arrangement. The remaining substrate area of about 120° is covered with the fourth electrode sector serving for homogenizing the electrostatic field of the capacitor arrangement.

In order to neutralize mechanical tolerances which might lead to position dependent air gap changes between the electrode structures, the counterelectrode and the electrode sections are divided into annular segments of equal area which are distributed along the entire circumference of the electrode structures. Consequently, the respective electrode-and counterelectrode sections do not occupy circular segments on substrate surface but are staggered over the entire surface of the assigned substrate. The staggered or distributed annular segments of the respective electrode sectors are electrically interconnected. In this manner, changes of dielectric (air gap) occurring during the relative movement of the electrode structures due to manufacturing tolerances are substantially neutralized by compensating the effects of a clearance increase at one side by a clearance decrease at the opposite side. The staggered annular segments of the electrode sectors are preferably in the form of flat ring segments.

The circuit arrangement of the electronic control means for detecting relative position of the capacitor arrangement and for delivering a corresponding measuring signal is electrically connected with the counterelectrode sector by means of a flexible electrical line which applies the potential of the counterelectrode to an input of the electronic regulating means.

In a modification, it is also possible to provide one of the electrode structures with a fifth electrode facing the counterelectrode sector in any position of the movable electrode structure whereby a.c. voltage induced by the counterelectrode on the fifth electrode is a measure of the charge condition of the counterelectrode. Therefore, the movable part of the capacitor arrangement needs no electro-mechanical contact between the counterelectrode and the input of the electronic control circuit. To that extent it is advantageous to provide the first, second, third and fifth electrodes on a stationary part or stator whereas the counter-electrode and the fourth electrode sector are arranged on a movable part or rotor.

In a further elaboration of the invention the fifth electrode has the form of a circle on the stator opposite a central region of the counterelectrode sector on the rotor. The central region of the counterelectrode sector is integrally connected with a semicircular electrode segment having the same radius as the fifth electrode and projecting between the radial flanks of the counterelectrode sector.

The regulating circuit includes an operational amplifier connected to an evaluation circuit. A fixed capacitor resulting between the counterelectrode and the third electrode sector is connected in a feedback branch of the operational amplifier.

It is of a particular advantage when voltages included at the counterelectrode or at the fifth electrode are rectified by means of a synchronized rectifier, whereby deviation from a desired zero potential at the counterelectrode is integrated in an operational amplifier connected as an integrator, and the integrated d.c. voltage at the output of the integrator is converted by means of a synchronous d.c./a.c. voltage changer into an a.c. regulating voltage which is applied to the third electrode section as the third a.c. voltage. The output d.c. voltage of the integrator is a measure of the relative position of the parts of the capacitor arrangement.

The invention will be explained in greater detail in the following description of preferred embodiments when read in connection with the accompanying drawings.

DESCRIPTION OF THE PREFERRED EMBODIMENTS

Figure 1:
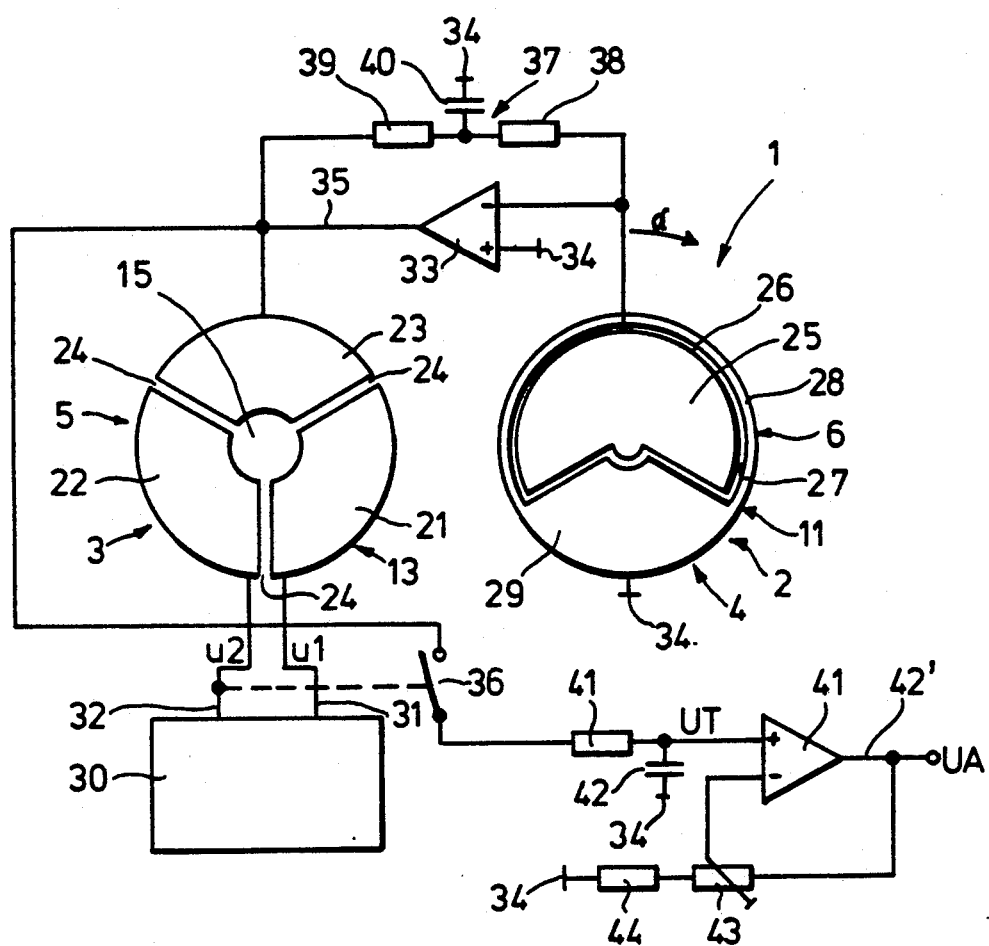
FIG. 1 is a schematic circuit diagram of an embodiment of a capacitive position sensor of the invention.

FIG. 1 shows a circuit diagram of a capacitive position sensor 1 having a capacitor arrangement 2 constructed as an angular position pickup for determining an angle of rotation, preferably for use in a motor vehicle to detect angular positions of a throttle valve in an internal combustion engine.

The capacitor arrangement 2 includes two electrode structures 3 and 4 which are movable relative to each other. The structure 3 is stationary to act as a stator 5, and the other structure 4 is constructed as a rotor 6.

Figure 2:
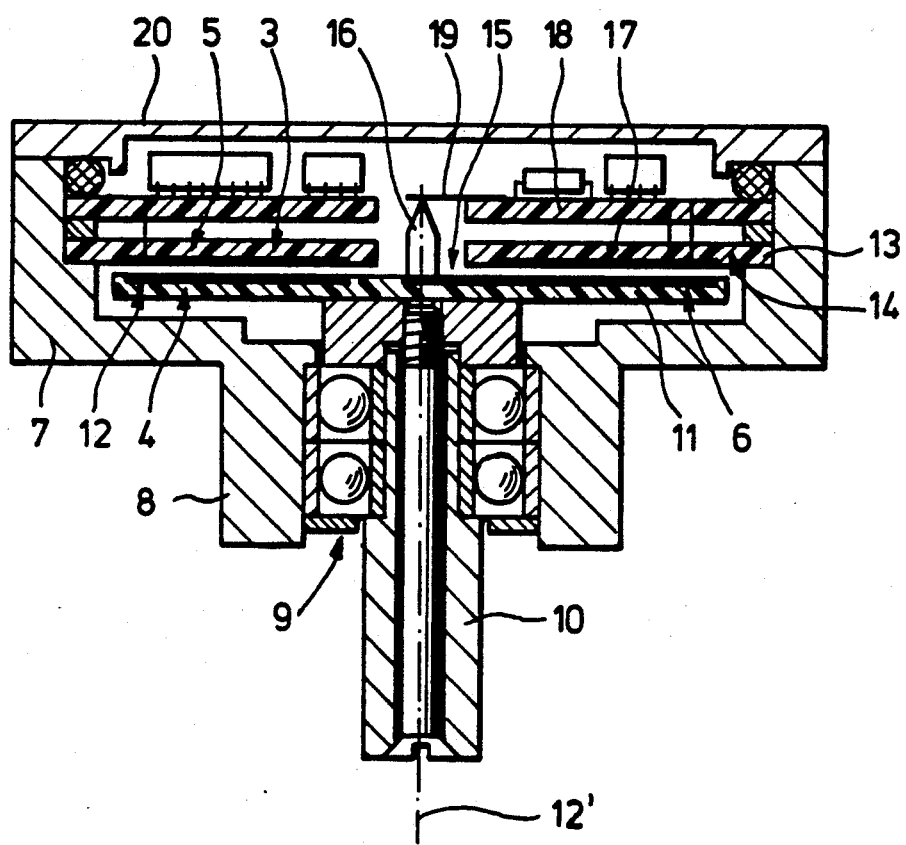
FIG. 2 is an axial section of the construction of the position sensor of FIG. 1.

The construction of the stator 5 and the rotor 6 is illustrated in FIG. 2. It includes a cup-shaped housing 7 formed with a flange 8 which encloses a ball bearing 9. The ball bearing 9 supports for rotation a shaft 10 whose free end is connected to a non-illustrated throttle valve of an internal combustion engine. The opposite end of the shaft 10 within the housing 7 is firmly connected with the rotor 6. The rotor 6 consists of a circular plate 11 whose center coincides with the longitudinal axis 12' of the shaft 10. The plate 11 includes a substrate for carrying an electrode structure 12 secured to one side of the substrate.

The stator 5 also has the form of a circular plate 13 which, in contrast to the rotor plate 11, is fixedly connected at its circumference to the housing 7. In this embodiment, the stator plate 13 is formed with a central opening 15 through which passes a contact pin 16 of the rotor 6. A side of the stator plate 13 facing the rotor plate 11 is provided with a stationary electrode structure 17 separated from the movable electrode structure 2 by an air gap acting as dielectric.

The housing 7 further encloses a printed circuit board 18 which carries electronic components of the regulating and evaluating circuit. The printed circuit board 18 also supports an electrical spring contact 19 projecting into a central opening of the board 18 to engage the contact pin 16. Alternatively, the contact pin 16 and the printed circuit board 18 can be interconnected by means of a flexible wire. The rear side of the housing 7 is closed by a cover 20.

The configuration of the electrode structures 12 and 17 is illustrated in FIG. 1. The plate 13 of stator 5 supports a first electrode 21, a second electrode 22 and a third electrode 23. The three stator electrodes 21–23 have the shape of circle sectors adjoining the central opening 15. As mentioned before, the stator 5 is made from a substrate plate coated with an electrically conductive layer. The radial isolating zones 13 separating the respective electrodes are produced by an etching process. The isolating zones 24 enclose an angle of about 120° relative to each other. Therefore, the angles of electrode sectors 21–23 are slightly less than 120° because of the width of the isolating zones.

For the sake of clarity, the rotor 6 of the capacitor arrangement 2 in FIG. 1 is illustrated beside the stator 5. Actually, as seen in FIG. 2, the rotor 6 concentrically faces the stator 5 such that the opposite surfaces of the plates 11 and 13 extend parallel to each other. The rotor plate 11 supports a counterelectrode 25 in the form of a circle sector of about 240°. The circular outer rim 26 of the counterelectrode 25 is surrounded by an electrode strip 28 which is integral with a fourth electrode 29 having the form of a circle sector of about 120°. The electrode strip 28 and the fourth electrode 29 are separated from the counter-electrode 25 by an isolating zone 27.

The rotor 6 is pivotable relative to the stator 5 within an angle range $\alpha$ of $\pm 60°$ (a measuring range). The position of the rotor 6 as illustrated in FIG. 1 corresponds to a starting or "0" position wherein the counter-electrode 25 overlaps half areas of the first and second electrode 21 and 22. The entire area of the third electrode 23 is always overlapped by the counterelectrode 25 in any angular position within the measuring range ($\pm 60°$).

The regulating and evaluating circuit in the embodiment of FIG. 1 includes an oscillator 30 which delivers at its outputs 31 and 32 two a.c. voltages u1 and u2 having the same amplitude at opposite phase. The first a.c. voltage u1 is applied to the first electrode sector 21 and the second a.c. voltage u2 is applied to the second electrode sector 22. The time course of the two voltages is illustrated in the upper half of the plot diagram of FIG. 3. The voltages u1 and u2 have a rectangular waveshape with an equal maximum amplitude $U_B$. The regulating circuit includes an operational amplifier 33 whose plus-input is connected to ground 34. The minus-input of the amplifier is connected with the counter-electrode 25. The output 35 of the amplifier 33 is connected to the third electrode sector 23 and to a contact of an electronic switch 36 which is operated in synchronism with the second a.c. voltage u2. In the feedback branch between the minus-input and the output 35 of the amplifier 33, there is connected an RC-network 37 consisting of a series connection of resistors 38, 39 and a capacitor 40 connected between the junction point of the two resistors and the ground. The fourth electrode sector 29 on the rotor 6 is also connected to the ground 34. The other contact of switch 36 is connected via a resistor 41 to the plus-input of another operational amplifier 41. A capacitor 42 connects the plus-input to ground 34. The output 42' of the amplifier 41 is connected via a series connection of resistors 43 and 44 to ground. The resistor 43 is a potentiometer whose sliding arm is connected to the minus-input of the amplifier 41. A signal $U_A$ at the output 42' of the operational amplifier 44 is a measure of the relative angular position between the stator 5 and the rotor 6.

The capacitor arrangement 2 in this embodiment includes alltogether five plate capacitors having, respectively:

| | |
|---|---|
| a variable capacity C1 | formed by the overlapped areas of the electrode sector 21 and the counter-electrode 25; |
| a variable capacity C2 | formed by the overlapped areas of the electrode sector 22 and the counter-electrode 25; |
| a fixed capacity CR | formed by continuously overlapped areas of the counterelectrode 25 and the third electrode sector 23. |

In addition, there result two plate capacitors between the electrode sector 21 and the fourth electrode sector 29, and between the electrode sector 22 and the fourth electrode sector 29. These two capacitors, as discussed before, serve for homogenizing electrical fields and for generating equal load capacitancies for the oscillator 30.

The capacities of C1 and C2, due to the variable overlapped area by the counterelectrode 25 are linear dependent on the angle of rotation $\alpha$ within the angle range of $-60° < \alpha + 60°$, whereby the following equations are valid:

$$C1 = 0.5 \cdot \epsilon \cdot A/d \, (1 + \alpha/60°) \quad [1]$$

$$C2 = 0.5 \cdot \epsilon \cdot A/d \, (1 - \alpha/60°) \quad [2]$$

wherein $\epsilon$ is the dielectric constant of the air gap, d is the thickness of the air gap beteen the facing electrodes and A denotes the active or overlapped surfaces of the resulting capacitors.

Since the third electrode 23 is always fully overlapped by the counterelectrode 25 irrespective of the angular position of the rotor, its capacity CR is independent of the angle of rotation and the following equation is valid:

$$CR = \epsilon \cdot A/d \quad [3]$$

Considering the difference between the capacities C1 and C2, there results:

$$C1 - C2 = \frac{\epsilon \cdot A \cdot \alpha}{d \cdot 60°}, \quad [4]$$

a value which changes proportionally with the angle of rotation $\alpha$ and also depends on magnitudes $\epsilon$, A and d. These magnitudes are always subject to outer influences such as humidity, thermal extensions, mechanical tolerances etc.

Consequently, through the non-negligible fluctuations of these magnitudes measuring errors may occur.

In this embodiment of the invention, there is provided the additional capacity CR. From the ratio $$(C1-C2)/CR,$$

there results in combination with equations [3] and [4]:

$$c(\alpha)=(C1-C2)/CR=\alpha/60° \quad [5]$$

wherein $c(\alpha)$ is independent of the magnitudes $\epsilon$, A and d. In practice, this result is valid with a good approximation provided that parasitic capacities of the circuit parallel to CR are small relative to CR.

The regulating and evaluating circuit of FIG. 1 converts the ratio $c(\alpha)$ into an analog d.c. voltage $U_A$ at the output 42' of the operational amplifier 41. The voltage $U_A$ represents a measure of the sensed angular position. It is evident that the capacity CR is present in the feedback branch of the operational amplifier 33. Since the amplifier 33 exhibits a large voltage amplification, the feedback has the effect that the a.c. voltage induced at the counterelectrode by a.c. voltages at the stationary electrode sectors 21-23, is practically reduced to zero ("0") value. Capacities formed between the counterelectrode 25 and the facing parts of the housing 7 or a grounded backside coating of the rotor 6, have no significant effect on the result of measurement.

The following relationship is valid for the negative feedback of the amplifier 33:

$$-uR=C1/CR\cdot u1+C2/CR\cdot u2 \quad [6],$$

wherein uR, u1 and u2 are rectangular wave components of the voltages UR, U1 and U2, whereby $$u1=-u2 \quad [7]$$

Combination of equation [6] with [7] and [5] results in $$uR/u2=(C1-C2)/CR=c(\alpha)=\alpha/60° \quad [8]$$

Due to the d.c. feedback (network 37) and the connection of the plus-input of the amplifier 33 with ground 34 the d.c. component UR $=0$, only the rectangular a.c voltage uR appears at the output of the amplifier 33.

This a.c. voltage uR is scanned by the switch 36, which is constructed as an electronic switch, in synchronism with the half-waves of the a.c. voltage u2, and the scanned voltage value UT is stored in capacitance 42. The scanned voltage value meets the following equation:

$$UT=0.5\ UB\alpha/60° \quad [9],$$

wherein UB is the maximum value of a.c. voltages u1 and u2.

The capacitor 42 is connected with the plus-input of the operational amplifier 41. The amplifier 41 operates as a loadable driver for the signal at the output 42'. By means of resistors 43 and 44, the amplification factor v of amplifier 41 is adjustable, thus enabling a calibration of the scale factor for the angle-to-voltage conversion. For, the output voltage UA at the output 42', the following relation is valid:

$$U_A=0.5\cdot v\cdot UB\cdot\alpha/60° \quad [10].$$

Figure 3:
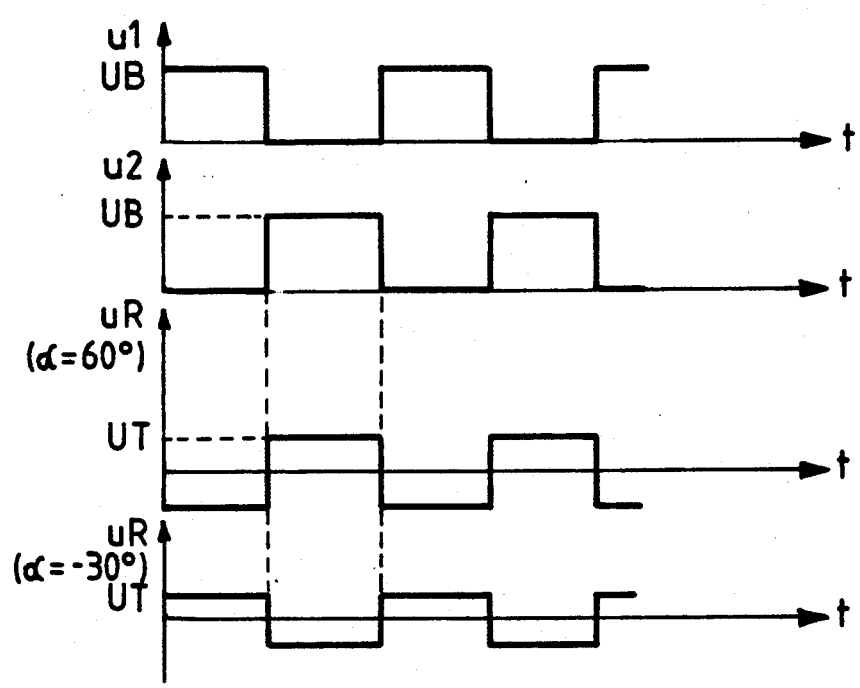
FIG. 3 is a time plot of electrode voltages in the embodiment of FIG. 1.

The foregoing explanations are elucidated in the time plots in the lower half of FIG. 3.

The embodiment of the invention has the following advantages:

The influence of the dielectric constant $\epsilon$, the active area A of the electrodes and the thickness d of the air gap on the result of measurement is substantially eliminated. Consequently, the manufacturing tolerances, axial play of the rotor in its bearing, thermal expansion and air humidity in the sensor affect the measuring result in a negligible degree only.

Figure 4:
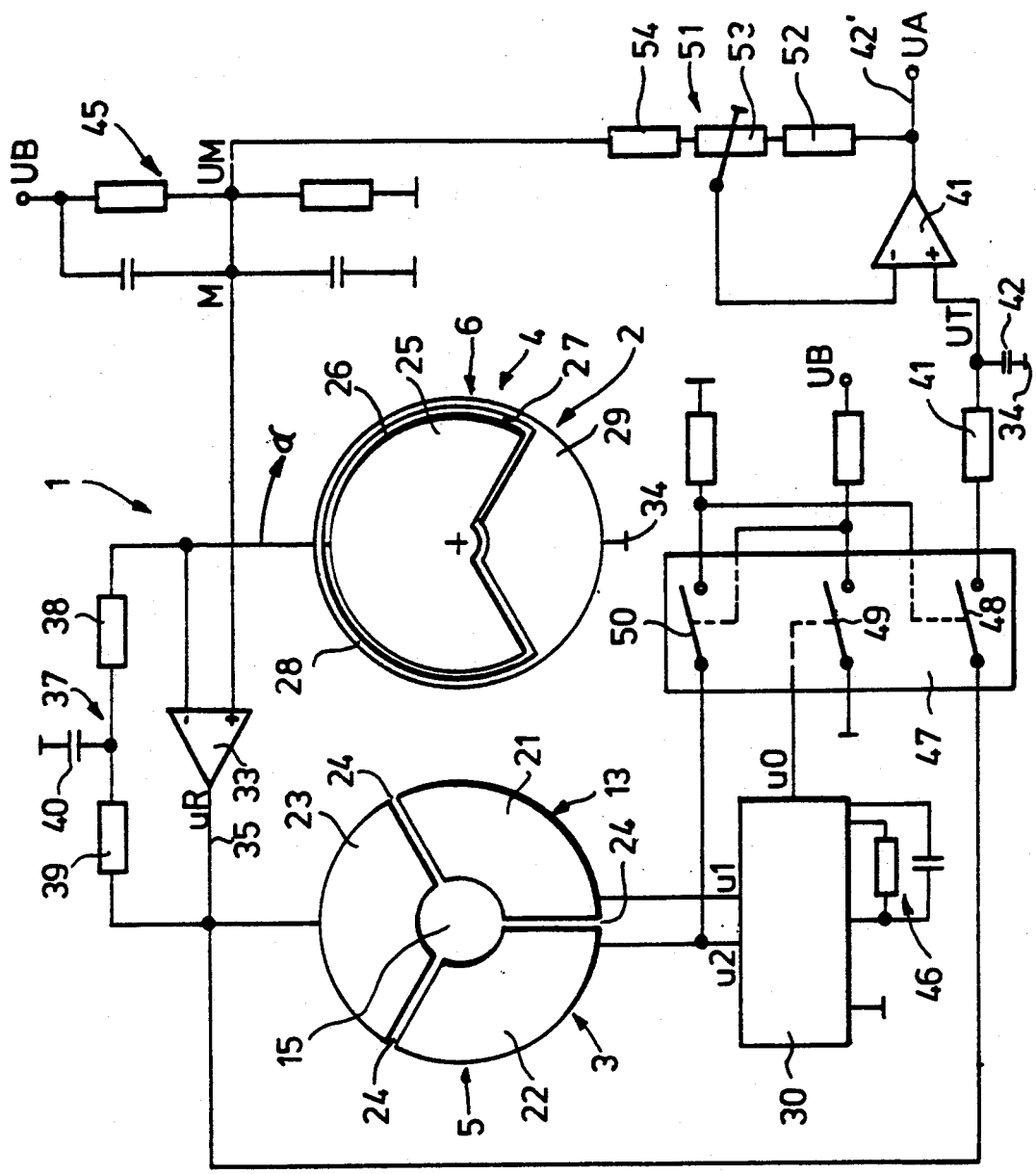
FIG. 4 is a circuit diagram of another embodiment of a capacitive position sensor of the invention.

FIG. 4 shows a further embodiment of the capacitive position sensor which employs CMOS IC's and operates with 5V operating voltage against ground, without the need of providing a symmetrical voltage source with respect to ground. The design of the circuit of FIG. 4 corresponds in many respects to that of FIG. 1. Therefore, only the differences will be discussed. By means of a voltage divider 45 the operating voltage UB is divided in such a way that at the point M a d.c. voltage UM is available for the offset of the operational amplifier 33. The offset voltage UM corresponds approximately to half of the operating voltage UB.

The oscillator 30 is constructed as an astable multivibrator whose frequency is set by an external network 46. Apart from the mutually inverted rectangular output voltages u1 and u2, the oscillator 30 delivers a rectangular voltage u0 at a doubled frequency, as shown in the time diagram of FIG. 5. By means of a network 37, the operational amplifier 33 is provided with a negative d.c. feedback for stabilizing operating point of the amplifier. For an a.c. feedback serves the capacity CR between the stator 5 and the rotor 6 of the capacitor arrangement 2. At the output of the operational amplifier 33, an approximately rectangular voltage uR is generated.

Figure 5:
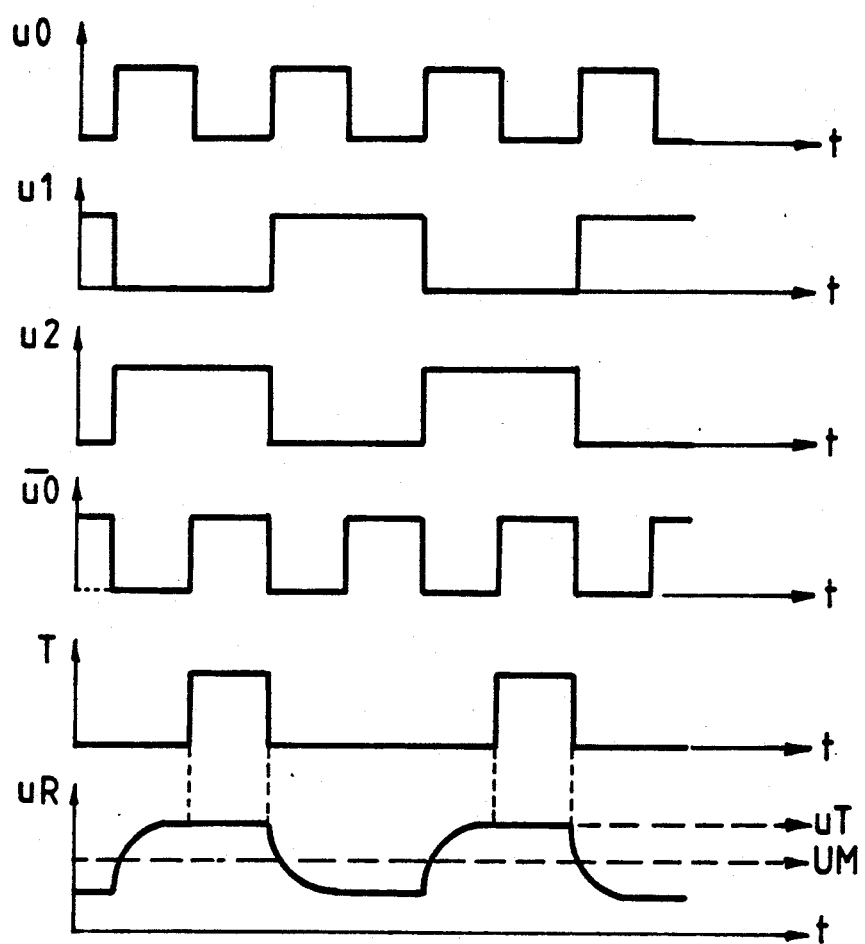
FIG. 5 is a time plot of voltages in the embodiment of FIG. 4.

For an angle of rotation $\alpha$ in the measuring range $-60° < \alpha < +60°$ the voltage difference uR—UM at the end of a negative half-wave of u1 represents a linear measure of the angle $\alpha$ (see FIG. 5). At this time point the following is valid:

$$UT=UT$$

$$UT-UM=k\cdot UB\cdot\alpha/60°,$$

wherein $k\approx 0.5$. The voltage UT is applied to the plus-input of the operational amplifier 41. By means of the electronic switch 47 the voltage uR is scanned during the second half of the negative half-wave of u1 and applied via a resistor 41 (load resistor) to the load capacitor 42. The scanning is performed by a switching element 48 of the electronic switch 47.

The switch 47 has two further switching elements 49 and 50 employed for generating from the voltage u1 and u0 scanning pulses T for activating the switching element 48.

The operational amplifier 41 is wired such as to produce at its output 42' the output voltage $$UA=v(UT-UM)+UM=(v\cdot k\cdot UB)\alpha/60°+UB/2$$

whereby the amplification factor v is adjustable by means of a voltage divider 51. The voltage divider 51 is formed by a series connection of resistors 52, 53 and 54 connected between the center point M of voltage divider 45 and the output 42' of the operational amplifier 41. The resistor 53 is a potentiometer whose sliding arm is connected to the minus-input of the operational amplifier 41. With the aid of the potentiometer 53, effects of manufacturing tolerances can be corrected by adjusting the steepness of the characteristic line of the position sensor.

In the embodiments of FIGS. 1 and 4 both the stator 5 and the rotor 6 have an active diameter of 40 mm; the air gap d between the electrode structures amounts to 0.8 mm; and the frequency of oscillator 30 is 25 kHz. Upon adjusting the aforementioned steepness of the sensor, the zero point of the angle scale can be redefined such that for example at a new angle $\alpha'=0$ the output voltage UA equals 0. The characteristic line of the resulting angle-to-voltage converter is represented for example by the equation $$UA/UB=0.008\ \alpha'$$

In the described experimental arrangement the characteristic line is maintained with a maximum deviation of $\pm 0.5\%$ within the measuring range of $10°\leq\alpha'\leq 110°$.

Figure 6:
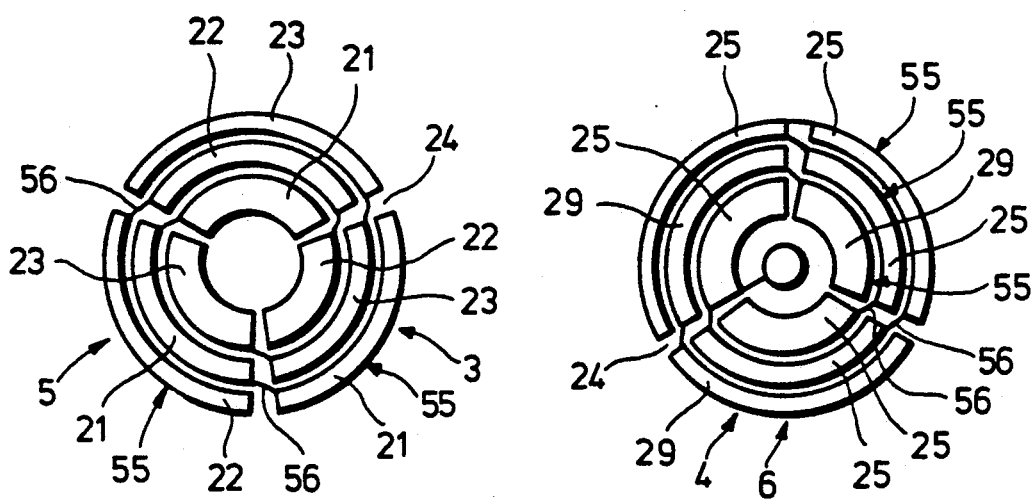
FIG. 6 is a modification of electrode structures in a capacitor arrangement of the position sensor of the invention.

The embodiments of capacitor arrangement 12 according to FIGS. 1 and 4 tend to produce measuring errors when the faces of the rotor 6 and the stator 5 are not exactly parallel at any angle of rotation $\alpha$. In particular, a rotor 6 which is not exactly perpendicular to the shaft axis 12' introduces linearity errors caused by air-gap changes between the juxtaposed electrodes due to a wobbling movement of the rotor. To eliminate this shortcoming, in the embodiment of FIG. 6 the electrode sectors 25 are divided into separate annular segments 55 each having the same area and being electrically connected by conductors 56 to form interleaved staggered electrodes extending along the entire circumference of the assigned circular substrate. In the embodiment of FIG. 6, each of the three electrode sectors 21, 22, 23 on the stator 5 is divided into three separate annular segments 55 which are staggered over the entire surface of the stator. Similarly, the fourth electrode sector 29 on the rotor 6 is divided into three annular segments 55 of equal area whereas the counterelectrode 25 is divided into six annular segments having the same area and staggered to interleave with the annular segments 55 of the fourth electrode sector 29 over the entire surface of the rotor.

In the event that the juxtaposed faces of the stator 5 and the rotor 6 are not plane parallel, the resulting fluctuations simultaneously take effect on all capacities defined approximately by all annular segments 55. Consequently, the influence of such fluctuations on the result of measurement is substantially neutralized. By virtue of the embodiment of FIG. 6, imperfections of parallelism due to manufacturing tolerances of the capacitor arrangement and the effect of such imperfections on linearity of the measuring result, is strongly reduced.

Figure 7:
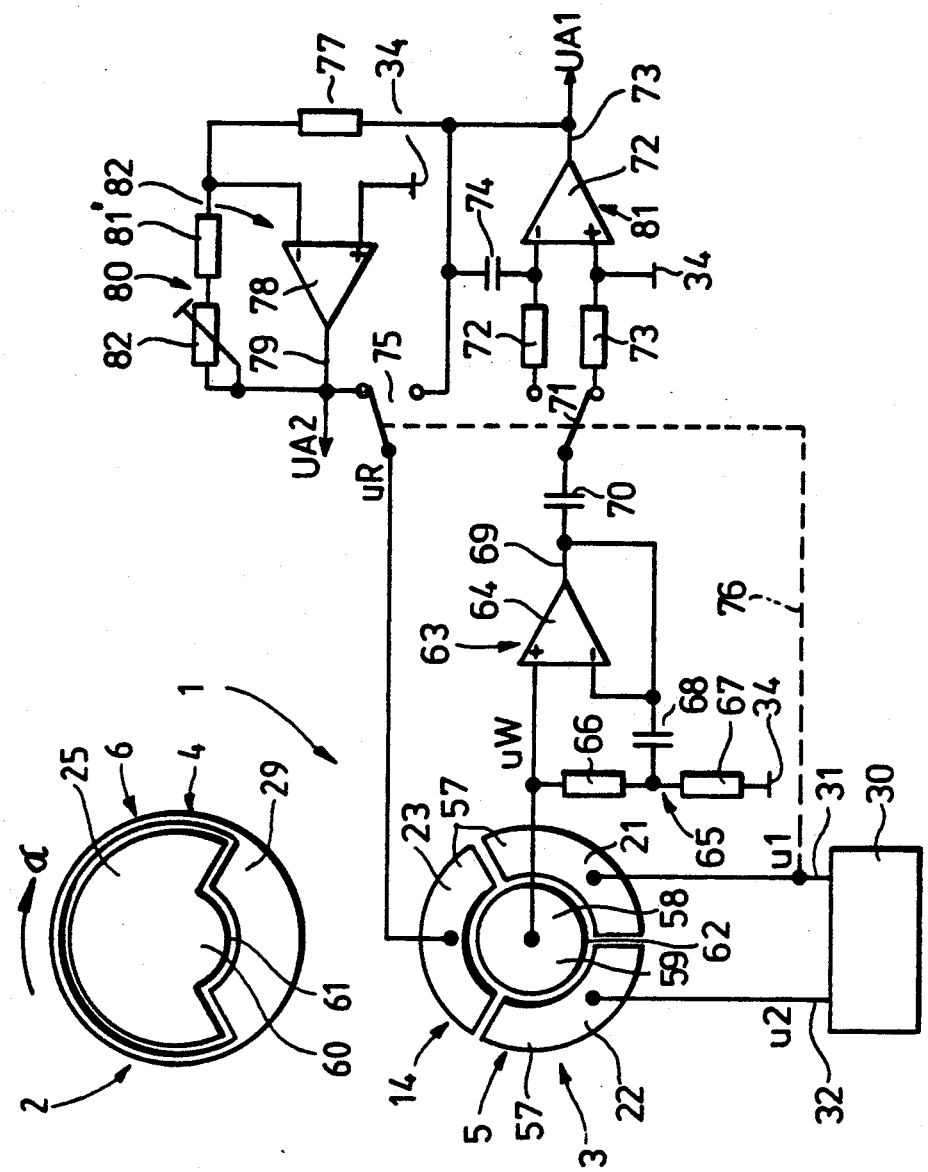
FIG. 7 is a circuit diagram of a further embodiment of the capacitive position sensor.

FIG. 7 illustrates still another embodiment of the capacitive position sensor of the invention wherein components parts described in preceding examples are designated by like reference numerals. By contrast to the embodiment of FIG. 1, the central region of the stator 5 is provided with a fifth electrode 58 having a circular surface 59 facing a corresponding circular surface portion 60 of the counterelectrode 25 on the rotor 6. The rim 61 of the central circular surface portion 60 of the counterelectrode coincides with the rim 62 of the circular fifth electrode 58 on the stator. The first, second and third electrode segments on the stator surround the circular fifth electrode 58 and the inner contour of the fourth electrode 29 on the rotor 6 matches the flanks and the circular rim 61 of the counterelectrode 25.

The regulating and evaluating circuit in the embodiment of FIG. 7 is provided with an impedance converter 63 including an operational amplifier 64. The plus-input of the amplifier 64 is connected with the circular fifth electrode 58 and is also connected to ground 34 via a voltage divider 65 formed by resistors 66 and 67. A capacitor 68 is connected between the connection point of the resistors 66 and 67 and the minus-input of the amplifier 64. The minus-input is directly connected to the output 69 of amplifier 64. The output 69 is connected via a capacitor 70 to a switching contact of a two-position switch 71. In one position of the switch 71, the capacitor 70 is connected via a resistor 73 to a grounded plus-input of an operation amplifier 72 whereas in the other position, the capacitor 70 is connected via a resistor 72' to the minus-input of the amplifier 72. The output 73 of the amplifier 72 delivers an output voltage UA1 and is connected via a capacitor 74 with the connection point of the resistor 72' and the minus-input. The output 73 is also connected to a contact of a further two-position switch 75 which is actuated in synchronism with the switch 71 and operates as a d.c. voltage to a.c. voltage changer. The actuation of the switches 71 and 75 takes place in dependency on the first a.c. voltage u1, as indicated by the dashed line 76.

The output 73 is further connected via a resistor 77 with the minus-input of an operational amplifier 78, whose plus-input is connected to ground 34. A series connection of a fixed resistor 81' and a trimmer resistor 82 is connected between the output 79 and the minus-input of the amplifier 78. The output 79 delivers an output voltage UA2 and is connected to a second contact of the switch 75. The switching arm of the switch 75 is connected with the third electrode segment 23.

The function of the circuit arrangement of FIG. 7 is as follows:

The a.c. voltages u1 and u2 on the electrode segments 21 and 22 electrostatically induce an a.c. voltage ui on the counterelectrode 25. Due to the variable overlapping of the electrode segments 21 and 22 by the counterelectrode 25, the a.c. voltage ui is a function of the angle of rotation $\alpha$. The a.c. voltage ui in turn induces a proportional a.c. voltage uW on the fifth circular electrode 58. The operational amplifier 68 due to its boot-strap wiring serves as an impedance converter 63 for the voltage source constituted by the capacitor arrangement 2. The impedance converter 63 has a large capacitive inner resistance. The before described two-position electronic switch 71 which is operated by the first a.c. voltage u1 to act as a synchronized rectifier, connects the output 69 of the impedance converter 63 alternately with the inputs of the operational amplifier 72 which is wired to operate as an integrator 81. The integrator is supplied with the synchronized a.c. voltage uW from the fifth circular electrode only during a halfwave. At a positive angle $\alpha$ the d.c. output voltage UA1 of the integrator 81 grows stepwise in the negative direction whereas at a negative angle $\alpha$ it grows in the positive direction. The output voltage UA1 of the integrator 81 is inverted by means of operational amplifier 78 which is wired as an inverter 82. Therefore, the following equation is valid:

$$UA2 = -UA1.$$

By means of the synchronized two-position electronic switch 75, a synchronized rectangular a.c. voltage uR is regenerated whose amplitude value corresponds to that of the d.c. voltage UA1 and whose phase is opposite to that of the a.c. voltage UW. The a.c. voltage uR is applied to the third electrode segment 23 to induce on the counterelectrode 25 an a.c. voltage which neutralizes the original a.c. voltage ui on the counterelectrode. The circuit arrangement thus provides a negative feedback resulting in a regulating circuit with an I-regulator.

The integrator 81 and the inverter 82 are active so long until the a.c. voltage uW = 0 and the induced neutralizing voltage ui also drops to zero. At the end of the regulating process the d.c. output voltage UA1 is a measure of the angle of rotation α. The embodiment of FIG. 7 in comparison with the embodiments of FIGS. 1 and 4 has the advantage that mechanical contacts, such as the contact pin 16 and the flexible conductor 19 between the rotor 6 and the electronic parts, can be dispensed with.

Figure 8:
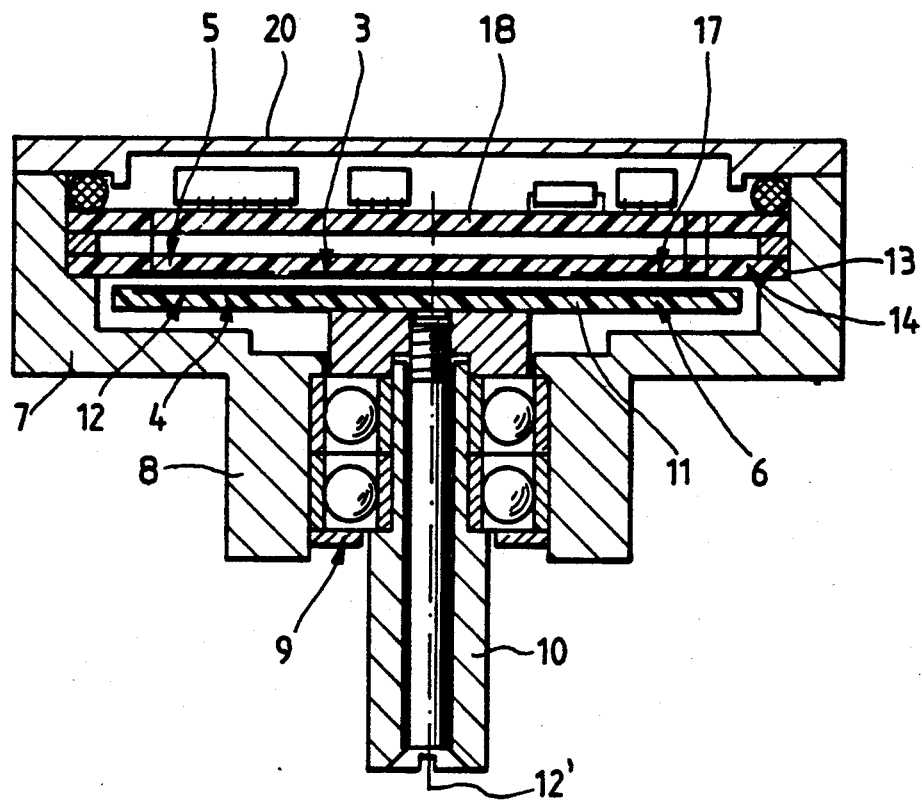
FIG. 8 is an axial section of the position sensor of FIG. 7.

FIG. 8 shows in a cross-section the mechanical construcion of the capacitive position sensor of FIG. 7. It is evident that in this embodiment the stator plate 13 and the printed circuit board 18 have no central opening for receiving a contact pin.

The rotor and stator of the capacitive position sensor of the invention is made of an electrically insulating substrate material such as glass, ceramics and the like, upon which the electrically inductive plates are secured and processed to form simple and not necessarily delicate electrode structures whose conductivity is not critical. The conductive electrode structures can be manufactured for example by etching a conductive coating on a laminated substrate or by screen printing of a conductive paste on the insulating substrate. It is also possible to produce the rotor plate from a sheet metal shaped into the form of the desired electrode structure and secured to the shaft 10 by means of an insulator.

In comparison with an inductive position sensor the capacitive sensor of the invention has the advantage that the electrical field between the stator and rotor electrode structures is very uniform and free of ripples which arise in the magnetic field of a coil and cause a non-linear (undulated) characteristic line. The circuit arrangement of the sensor of the invention is incomplex, requires a very small operational current, and operates at a relatively low frequency. The generated electrical fields are easy to shield, which is not the case in prior art inductive position sensors. Interfering emissions or immissions are absent.

What is claimed as new and desired to be protected by Letters Patent is set forth in the appended claims.

We claim:

1. A capacitive position sensor, particularly an angular position sensor for use in connection with a throttle valve of an internal combustion engine, comprising a capacitor arrangement (2) having two facing electrode structures (3, 4) supported for movement relative to each other, one of said electrode structures including at least three coplanar electrodes (21, 22, 23) and the other electrode structure including at least a planar counter-electrode (25);

means for applying a first a.c. voltage (u1) to a first electrode (21), and a second a.c. voltage (u2) of equal amplitude and of opposite phase to a second electrode (22) of said one electrode structure;

regulating means for applying a third a.c. voltage (uR) to a third electrode (23) of said one electrode structure, said regulating means being coupled to said counterelectrode (25) of the other electrode structure to regulate said third a.c. voltage (uR) to an amplitude and phase value at which an a.c. voltage which has been induced by said first, second and third electrodes (21, 22, 23) on said counterelectrode (25), is neutralized to zero; and means for converting the neutralizing value of said third a.c. voltage (uR) into a d.c. voltage value (UA) serving as a measure of the relative position of said movable electrode structures (3, 4).

2. A position sensor as defined in claim 1, wherein said electrode structures are movable relative to each other within a predetermined measuring range, and the configuration of said electrode structures being such that during the relative movement of said counterelectrode within said measuring range said third electrode (23) is fully overlapped by a portion of said counterelectrode in any position thereof.

3. A position sensor as defined in claim 2, wherein during the relative movement of said counterelectrode within said measuring range surface portions of said first and second electrode are overlapped by said counterelectrode in such a manner that the overlapped surface portion of the first electrode increases or decreases in direct proportion to the decrease or increase of the overlapped surface portion of said second electrode.

4. A position sensor as defined in claim 3, wherein the value of said induced a.c. voltage on said counter-electrode depends on the position of said first and second electrodes (21, 22) relative to said counterelectrode.

5. A position sensor as defined in claim 3, further comprising a fourth electrode (29) arranged on said other electrode structure (4) to homogenize electric fields in said capacitor arrangement.

6. A position sensor as defined in claim 3, wherein said electrode structures (3, 4) have the form of juxtaposed circular plates concentrically arranged one above the other, one of the circular plates being stationary to form a stator, and the other circular plate being supported for rotation about a common center axis to form a rotor (6).

7. A position sensor as defined in claim 6, wherein said first, second and third electrode (21, 22 and 23) has the shape of a circle sector of about 120°.

8. A position sensor as defined in claim 7, wherein said counterelectrode has the shape of a circle sector of about 240°.

9. A position sensor as defined in claim 8, wherein a fourth electrode (29) in the form of a circle sector of about 120° is arranged coplanar with said counterelectrode on said rotor (6).

10. A position sensor as defined in claim 9, wherein said fourth electrode is grounded.

11. A position sensor as defined in claim 9, wherein the circle sector of each of said electrodes (21, 22 23 and 29) and of the counterelectrode (25) is divided into separate segments (55) having a uniform area, and the segments of the respective electrodes being staggered along the circumference of said stator or rotor and electrically connected to each other.

12. A position sensor as defined in claim 11, wherein said segments are annular segments.

13. A position sensor as defined in claim 9, wherein said counterelectrode is connected to said regulating means by a flexible electrical conductor.

14. A position sensor as defined in claim 9, wherein said one electrode structure is provided with a fifth electrode which is fully overlapped by a portion of said counterelectrode in any position of said rotor, and said converting means being connected to said fifth electrode to evaluate a.c. voltage induced thereon as a measure of load condition on said counterelectrode.

15. A position sensor as defined in claim 14, wherein said fifth electrode is a circular electrode concentrically arranged on said stator, and said first, second and third electrodes having the shape of an annular segment surrounding said fifth electrode.

16. A position sensor as defined in claim 2, wherein said regulating means includes an operational amplifier having a feedback branch; and a capacitor formed by said third electrode (23) and said counterelectrode being connected in said feedback branch.

17. A position sensor as defined in claim 16, wherein said converting means includes an integrator (81) coupled via a synchronized rectifier (71) to said fifth electrode to deliver at its output an integrated d.c. voltage (UA1); said regulating means including an inverter (78) for inverting said integrated d.c. voltage (UA1) at the output of said integrator and a synchronized d.c. voltage-to-a.c. voltage changer (75) for converting the integrated d.c. voltage (UA1) into the third a.c. voltage (uR) and applying the same to said third electrode (23) until the induced a.c. voltage on said counterelectrode is neutralized to zero where-upon said integrated d.c. voltage (UA1) represents a measure of the position of said rotor.

18. A position sensor as defined in claim 17, wherein said synchronized rectifier includes a first electronic two-position switch, said integrator including a first operational amplifier having a plus-input connected to one contact of said first switch and a minus-input connected to the other contact of said first switch, said inverter including a second operational amplifier having a grounded plus-input, a minus-input connected to the output of said first operational amplifier and an output connected to its minus-input, and said d.c. voltage-to-a.c. voltage changer including a second electronic two-position switch having one contact connected to the output of said second operational amplifier and another contact connected to the output of said first operational amplifier.

* * * * *